United States Patent [19]

Weemes et al.

[11] 4,327,198

[45] Apr. 27, 1982

[54] POLYMERIC MOLDING COMPOSITIONS HAVING THE HIGH IMPACT STRENGTH

[75] Inventors: Doyle A. Weemes, Greeneville; Robert W. Seymour, Kingsport, both of Tenn.

[73] Assignee: Eastman Kodak Company, Rochester, N.Y.

[21] Appl. No.: 257,446

[22] Filed: Apr. 24, 1981

[51] Int. Cl.$^3$ ............................................ C08L 51/08
[52] U.S. Cl. ...................................... 525/63; 525/177; 525/445
[58] Field of Search ........................... 525/63, 445, 177

[56] References Cited
U.S. PATENT DOCUMENTS 3,657,389  4/1972  Caldwell et al. .................... 525/177
4,081,422  3/1978  Cordes et al. ....................... 525/67

*Primary Examiner*—J. Ziegler
*Attorney, Agent, or Firm*—John F. Stevens; Daniel B. Reece, III

[57] ABSTRACT

Disclosed are compositions comprising blends of (a) a polyester having an inherent viscosity of about 0.4–1.5, (b) about 5 to about 35 weight %, based on the weight of the composition, of polyethylene having a melt index of about 0.1–15.0 and a density of about 0.910–0.965, and (c) about 0.25 to about 5 weight %, based on the weight of the composition, of poly(tetramethylene terephthalate)-co-2-butene-1,4-diol having an inherent viscosity of 0.9 to 1.5 grafted with a low density polyethylene. These compositions are especially useful as molding compositions because of their high impact strength.

12 Claims, No Drawings

POLYMERIC MOLDING COMPOSITIONS HAVING THE HIGH IMPACT STRENGTH

TECHNICAL FIELD

This invention relates to new high-impact molding compositions of polyesters and polyethylenes which contain low concentrations of poly(tetramethylene terephthalate)-co-2-butene-1,4-diol grafted with polyethylene as a third component. These compositions show surprisingly high levels of impact strength while retaining a high level of tensile and flexural properties.

BACKGROUND ART

Two- and three-component polymer blends are well known in the art. Examples include U.S. Pat. Nos. 3,769,260; 3,578,729; 3,639,527; 3,435,093; and 4,081,422. The present invention differs from the compositions disclosed in these patents in that the third component is a poly(tetramethylene terephthalate)-co-2-butene-1,4-diol-g-polyethylene. It is believed that the unobviously high-impact strength and good dispersion of polyethylene in the polyester results from the ability of the graft copolymer to compatibilize the polyethylene with the polyester.

DISCLOSURE OF INVENTION

According to the present invention, there is provided a tricomponent blend of polymers especially useful as molding compositions and having an unexpectedly high impact strength while retaining a high level of tensile and flexural properties.

The compositions of the present invention comprise blends of (a) polyester, (b) polyethylene and (c) poly(tetramethylene terephthalate)-co-2-butene-1,4-diol grafted with polyethylene (hereafter sometimes referred to as graft copolymer). It has been found that specific combinations of polyesters with polyethylene and graft copolymer show high levels of notched and unnotched Izod impact strength while retaining a high level of tensile strength and good flexural properties. The impact properties of the tricomponent blends are generally superior to those obtained with two-component blends of polyester and polyethylene. The graft copolymer tends to provide better dispersion of the polyethylene in the polyester relative to the two-component polyester/polyethylene blends. Such high-impact polyesters are useful in applications when improved impact strength is required.

The polyesters useful in this invention are homo- or copolyesters having inherent viscosities (I.V.) of about 0.4 to about 1.5.

The dibasic acid component of the polyester comprises terephthalic acid, or a mixture of terephthalic acid with isophthalic acid. The acid component may be further modified with up to 50% (based on a total acid content of 100 mole %) of an aliphatic or aromatic dicarboxylic acid having from 3 to 12 carbon atoms. Examples of suitable modifying acids include succinic; glutaric; adipic; azelaic; sebacic; fumaric; maleic; itaconic; 1,4-cyclohexanedicarboxylic; and phthalic.

It should be understood that use of the corresponding acid anhydrides, esters, and acid chlorides of these acids is included in the term "dicarboxylic acid".

The glycol component may consist of one or more aliphatic or alicyclic glycols having 2 to 12 carbon atoms. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol, 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol.

The glycol component may also contain up to about 25 weight % of a polymeric glycol such as a polyalkyleneether glycol where the alkyl groups contain from 2 to 6 carbon atoms. Examples include polypropyleneether glycol, polytetramethyleneether glycol, etc. The glycol components are based on 100 mole % glycol. Conventional esterification processes may be used.

The polyethylenes useful in this invention are the high and low density polyethylenes having melt indices of about 0.1 to about 15.0 and densities of about 0.910 to about 0.965.

The graft copolymer component of this invention is a copolymer of poly(butylene terephthalate) (PBT) grafted with 2-butene diol and is formed by adding polyethylene to PBT. This is accomplished by conventional means such as mixing, extruding, etc. In order to insure polymerization of the polyethylene onto the PBT, minor amounts such as about 0.1 to about 3 wt. % based on PBT of at least partially unsaturated material such as 2-butenediol are required. The 1,4-butenediol provides the necessary unsaturation for grafting of the polyethylene onto the PBT. As mentioned, the grafting operation may be conveniently carried out in conventional mixing and extruding equipment.

Polyethylene used in forming PBT/polyethylene graft polymers in accordance with the invention preferably has a number average molecular weight between about 24,000 and about 290,000 and an intrinsic viscosity between about 0.7 and about 1.7 in decalin at 135° C. PBT/polyethylene graft polymers preferably comprise between about 60 and about 98 wt. % PBT.

The blends contain about 5 to about 35 weight percent polyethylene and about 0.25 to about 5 weight percent graft copolymer. The preferred concentration of polyethylene is 20 to 30 weight percent. The preferred concentration of the graft copolymer is 0.25 to 3 weight percent. These compositions may be prepared on conventional melt-mixing equipment suitable to the molding plastic involved; for example, a compounding extruder. Because of the increased Izod impact strength of these blends, they will perform well in injection-molding applications where greater impact strength is required, such as shower heads, automobile parts, and welding face shields and masks.

The examples which follow are submitted for a better understanding of the invention.

EXAMPLE 1

The materials used in these blends are poly(tetramethylene terephthalate); (I.V.=1.18; density=1.296), polyethylene (melt index=7.0; density 0.917), and poly(tetramethylene terephthalate)-co-3-(2-butene-1,4-diol)-g-polyethylene (I.V.=0.97; density=1.237). Blends are compounded by extrusion and molded in a Newbury machine at 240° C. using a 23° C. mold temperature. This is an example of the good impact strength obtained on polyester/polyethylene blends containing 2 weight percent of the third component while retaining a high level of other mechanical properties (Example 5, Table 1). It is also surprising to note that the three component blends have superior properties to those of the 100% graft copolymer (Example 7, Table 1).

EXAMPLE 2

The materials used in these blends are poly(tetramethylene terephthalate) (I.V.=1.18; density=1.296), polyethylene (melt index=7.0; density=0.917), and poly(tetramethylene terephthalate)-co-5-(2-butene-1,4-diol)-g-polyethylene (I.V.=1.04; density=1.238). Blends are compounded by extrusion and molded in a Newbury machine at 240° C. using a 23° C. mold temperature. This example demonstrates that the level of 2-butene-1,4-diol in the graft copolymer does not adversely affect the good impact strength of polyester/polyethylene blends when used at a 2 weight percent concentration (Example 2, Table 1). It is readily noted that the three component blends have superior properties compared to the polyester/polyethylene two component blend as well as the 100% graft copolymer (Example 8 and 7, respectively, Table 1).

EXAMPLE 3

The materials used in these blends are poly(tetramethylene terephthalate) (I.V.=1.18; density 1.296), polyethylene (melt index=7.0; density=0.917), and poly(tetramethylene terephthalate)-co-3-(2-butene-1,4-diol)-g-polyethylene (I.V.=0.97; density=1.238). The blend is compounded by extrusion and molded in a Newbury machine at 240° C. using a 23° C. mold temperature. This example demonstrates that there is an unexpected critical concentration for the third component graft copolymer. This polyester/polyethylene blend contains 5 weight percent of the third component and the Izod impact strength is less than that of the two component blends (Examples 9 and 8, respectively, Table 1).

EXAMPLE 4

The materials used in this blend are poly(ethylene terephthalate) (I.V.=0.69; density=1.335), polyethylene (melt index=7.0; density=0.917), and poly(tetramethylene terephthalate)-co-3-(2-butene-1,4-diol)-g-polyethylene (I.V.=0.97; density=1.238). The blend is compounded by extrusion and molded in a Newbury machine at 255° C. using a 23° C. mold temperature. It is noted that the three component blends have superior flexural properties, unnotched Izod impact strength, and tensile properties compared to polyethylene terephthalate/polyethylene two component blend control (Table 2).

TABLE 1

Mechanical Properties of Poly(butylene Terephthalate)/Polyethylene Blends[a]

| | Polymer Blends, Wt. %[b] | | | | | Flexural, psi | |
|---|---|---|---|---|---|---|---|
| Ex. No. | Poly-(Butylene terephthalate) | Poly-ethylene | PTMT-co-(2-Butene-1,4-Diol)-g-Polyethylene | I.V. Before/After Molding | Density | Strength X10³ | Modulus X10⁵ |
| 5 | 66.4 | 31.6 | 2.0[c] | 1.14/1.02 | 1.134 | 6.19 | 1.81 |
| 6 | 66.4 | 31.6 | 2.0[d] | 1.14/0.88 | 1.144 | 6.30 | 1.60 |
| 7 | — | — | 100[c] | 1.0/0.87 | 1.237 | 9.94 | 2.84 |
| 8 | 66.4 | 33.6 | — | 1.1/1.03 | 1.135 | 6.57 | 1.91 |
| 9 | 65.0 | 30.0 | 5.0[c] | 1.2/0.98 | 1.140 | 6.95 | 1.98 |

| | Tensile Properties, psi | | % Elong. Break | Hardness R/L[f] | Izod Impact, ft-lb/in.[e] | | | |
|---|---|---|---|---|---|---|---|---|
| | | | | | Notched | | Unnotched | |
| Ex. No. | Yield | Break | | | 23° C. | −40° C. | 23° C. | −40° C. |
| 5 | 4526 | 3652 | 35 | 85/22 | P 5.1 | H 1.9 | N 22.1 | 60% N 19.6 |
| 6 | 4420 | 2809 | 30 | 86/21 | P 4.6 C | H 2.0 C | N 23.2 25% N | 60% N 27.2 C |
| 7 | 6424 | 4917 | 30 | 109/80 | 0.39 N | 0.51 N | 17.2 N | 8.9 C |
| 8 | 4515 | 3337 | 25 | 85/32 | 1.4 H | 0.72 P | 27.5 H | 12.6 C |
| 9 | 4758 | 4158 | 13 | 85/37 | 1.2 | 0.62 | 1.8 | 3.2 |

[a]Premixed blends are compounded by extrusion and molded in a Newbury machine at 240° C. using a 23° C. mold temperature.
[b]Based on total weight.
[c]Contains 3 mole percent 2-butene-1,4-diol.
[d]Contains 5 mole percent 2-butene-1,4-diol.
[e]P = Partial; H = Hinged; N = No Break; C = Complete Break.
[f]Rockwell Hardness Test (R scale and L scale) ASTM D785.

TABLE 2

Mechanical Properties of Poly(ethylene Terephthalate)/Polyethylene Blends[a]

| | Polymer Blends, Wt. % | | | | | Flexural, psi | |
|---|---|---|---|---|---|---|---|
| Ex. No. | Poly-(Ethylene terephthalate) | Poly-ethylene | PTMT-co-3 mol % of (2-Butene-1,4-Diol)-g-Polyethylene | I.V. Before/After Molding | Density | Strength X10³ | Modulus X10⁵ |
| 10 | 76.2 | 26.8 | 2.0 | 0.65/0.51 | 1.195 | 10.24 | 2.52 |
| 11 | 76.2 | 23.8 | — | 0.57/0.47 | 1.198 | 8.93 | 2.49 |

TABLE 2-continued

Mechanical Properties of Poly(ethylene Terephthalate)/Polyethylene Blends[a]

| Ex. No. | Tensile, psi | | % Elong. Break | Hardness R/L | Izod Impact, ft-lb/in.[b] | | | |
|---|---|---|---|---|---|---|---|---|
| | Yield | Break | | | Notched | | Unnotched | |
| | | | | | 23° C. | −40° C. | 23° C. | −40° C. |
| 10 | — | 7466 | 8 | 105/73 | CB 0.38 | CB 0.46 | CB 3.6 | CB 3.1 |
| 11 | — | 6151 | 6 | 103/73 | CB 0.31 | CB 0.40 | CB 1.4 | CB 1.2 |

[a]Premixed blends were compounded by extrusion and molded in a Newbury machine at 255° C. using a 23° C. Mold; Samples annealed before testing.
[b]CB = Complete Break.

EXAMPLE 8

This example illustrates the production of a graft polymer of PBT with polyethylene suitable for use in forming compositions of the invention. In this example the PBT is first formed as described immediately below and polyethylene then graft polymerized onto the PBT. The starting ingredients for PBT manufacture are:

| Ingredient | Amount |
|---|---|
| 1,4-Butanediol | 1059.5 g. |
| 2-Butenediol | 27.5 g. |
| Dimethyl terephthalate | 1799 g. |
| Tetraisopropyl Titanate | 1.08 g. in 10 ml. xylene |

The polymer is prepared by introducing the above ingredients into a 1 gallon stainless steel reactor equipped with a mechanical stirrer, a bottom discharge valve, vacuum and heating controls, a condenser and a receiver. The reactor is closed and the mixture heated while stirring under a vacuum of 200 millimeters of mercury. At 130° C.-140° C. (after 30 min.) distillation of methanol begins. After 75 minutes elapsed time, the temperature of the reaction mixture has reached 200° C. and is maintained at this level for an additional 30 minutes. The receiver is then replaced and the pressure in the reactor reduced to 0.1-1.0 millimeter of mercury over a period of 5 to 10 minutes. The temperature is increased to 250° C. over a period of 30 minutes and heating and stirring under these conditions are continued for an additional two hours. During this period the melt viscosity increases gradually as determined by increase in the electrical current required by the stirring motor. When an appropriate intrinsic viscosity of about 0.7 to about 0.9 dl/g in o-chlorophenol is obtained, the vacuum is broken off by introducing nitrogen into the system and the product is discharged under a pressure of 20-30 PSI as a viscous fluid. 1905-1971 grams of a white semi-crystalline copolymer are obtained, representing 97 percent yield based on terephthalate and having an intrinsic viscosity of 0.90 in o-chlorophenol. This product is processed in a conventional manner to form granulated resin.

To 950 grams of granulated resin obtained as described immediately above, 50 grams of powdered polyethylene having an intrinsic viscosity of 1.62 dl/g in decalin at 135° C. are added together with 2.0 grams of 2,5-dihydroperoxy-2,5-dimethyl-hexane. This mixture is then blended mechanically and extruded into strands using a ¾ inch laboratory extruder operated at a screw speed of 20 rpm at 480° F. The strands are then cut into pellets. The physical properties of the resulting graft copolymer of PBT and polyethylene are summarized in the below table.

| Material of Example No. | Physical Properties of Polymers of Example 8 | | | |
|---|---|---|---|---|
| | density[1] g/cc. | Intrinsic viscosity[2] dl/g | M.p.[3] C. | onset of thermal[4] instability, C. |
| 5 | 1.29 | 0.96 | 125 & 215 | 350 |

[1]Density was determined according to ASTM D-792.
[2]Measured in o-chlorophenol at 25° C.
[3]By Differential Thermal Analysis at a heating rate of 20 ° C./minute under nitrogen atmosphere.
[3]By Differential Thermal Analysis at a heating rate of 20° C./minute under nitrogen atmosphere.

In the examples, the physical properties of samples of the compositions are determined as follows:
Density: Conventional density gradient tube.
Melt Index: ASTM D1238
Inherent Viscosity (I.V.): Viscosity determinations made at 25° C. using 0.25 gram of polymer per 100 ml. of a solvent composed of 60 percent phenol and 40 percent tetrachloroethane.
ASTM procedures are used for measuring the tensile strength and elongation (ASTM D638), flexural modulus (ASTM D790), Izod impact strength (ASTM D256 Method A), and heat-deflection temperature (ASTM D648).
Unless otherwise specified, all parts, percentages, ratios, etc., are on a weight basis.
The invention has been described in detail with particular reference to preferred embodiments thereof, but it will be understood that variations and modifications can be effected within the spirit and scope of the invention.

We claim:
1. Composition of matter comprising
   (a) a polyester derived from 100 mole % dibasic acid and 100 mole % glycol, at least 50 mole % of said dibasic acid being terephthalic acid or a mixture of a substantial amount of terephthalic acid with isophthalic acid, said glycol component comprising at least 75 mole % of one or more aliphatic or cycloaliphatic glycols having from 2 to 12 carbon atoms, said polyester having an I.V. of about 0.4-1.5,
   (b) about 5 to about 35 weight %, based on the weight of the composition, of polyethylene having a melt index of about 0.1-15.0 and a density of about 0.910-0.965, and
   (c) about 0.25 to about 5 weight %, based on the weight of the composition, of poly(tetramethylene terephthalate)-co-2--butene-1,4-diol having an I.V.

of 0.9 to 1.5 grafted with a low density polyethylene.

2. Composition according to claim 1 wherein the glycol from which said polyester is derived comprises a polyalkyleneether glycol wherein the alkylene group contains 2 to 6 carbon atoms in an amount less than 25 weight % based on the weight of glycol.

3. Composition according to claim 1 wherein said poly(tetramethylene terephthalate)-co-2-butene-1,4-diol is grafted with polyethylene having a number average molecular weight between about 24,000 and about 290,000 and an intrinsic viscosity of between about 0.7 and about 1.7 in decalin at 135° C.

4. Composition according to claim 1 wherein the graft copolymer comprises between about 60 and about 98 weight % poly(butylene terephthalate).

5. Composition according to claim 1 wherein said polyethylene of (b) is present in an amount between about 20 and about 30 weight %, based on the weight of the composition.

6. Composition according to claim 1 wherein the graft copolymer of (c) is present in an amount between about 0.25 and about 3%, based on the weight of the composition.

7. A molded article comprising the composition of claim 1.

8. A molded article comprising the composition of claim 2.

9. A molded article comprising the composition of claim 3.

10. A molded article comprising the composition of claim 4.

11. A molded article comprising the composition of claim 5.

12. A molded article comprising the composition of claim 6.

* * * * *